United States Patent [19]

Giusto

[11] 3,914,695

[45] Oct. 21, 1975

[54] DATA TRANSMISSION WITH DUAL PSK MODULATION

[75] Inventor: Pietro Porzio Giusto, Turin, Italy

[73] Assignee: CSELT - Centro Studi e Laboratori Telecomunicazioni SpA, Turin, Italy

[22] Filed: July 10, 1974

[21] Appl. No.: 486,999

[30] Foreign Application Priority Data

July 12, 1973 Italy .................................. 69081/73

[52] U.S. Cl. ..................... 325/145; 178/67; 325/47

[51] Int. Cl.$^2$ ........................................... H04B 1/04

[58] Field of Search ................. 325/30, 47, 60, 145; 178/67

[56] References Cited

UNITED STATES PATENTS

| | | | |
|---|---|---|---|
| 3,051,902 | 8/1962 | Ross | 325/60 |
| 3,423,529 | 1/1969 | O'Neill, Jr. | 325/60 |

*Primary Examiner*—George H. Libman
*Attorney, Agent, or Firm*—Karl F. Ross; Herbert Dubno

[57] ABSTRACT

A binary data stream of cadence $f$ to be transmitted by PSK (phase-shift keying) modulation is split into two pulse sequences, composed of alternate bits of that data stream, which are translated into 180° phase shifts of respective sinusoidal carrier waves in quadrature with each other, the frequency $f$ of the two carrier waves being the reciprocal of the pulse width $2/f$ of the two pulse sequences in a specific instance. A pair of interleaved trains of trigger pulses, each coinciding with the zero crossings of a respective carrier wave, enable the operation of associated phase shifters — in response to amplitude changes of the respective pulse sequences — only at a peak of a carrier wave in trailing position or at a zero crossing of a carrier wave in leading position, thereby minimizing the amplitude excursions occurring upon a subsequent passage of the combined carrier waves through a band-pass filter or other network of limited bandwidth.

10 Claims, 4 Drawing Figures

DATA TRANSMISSION WITH DUAL PSK MODULATION

FIELD OF THE INVENTION

My present invention relates to the transmission of binary information, especially data, by interleaved phase reversals of two carrier waves.

BACKGROUND OF THE INVENTION

A system of this nature, using double-binary phase-shift keying (PSK), has been discussed in an article by Robert K. Kwan published in the July 1969 issue of IEEE TRANSACTIONS ON AEROSPACE AND ELECTRONIC SYSTEMS, pages 589–594. Its principle resides in splitting a bit stream with a signaling speed or cadence *f*, such as a binary data stream, into two pulse sequences which are composed of alternate bits of that stream, suitably lengthened to a pulse width $2/f$, and which are translated into 180° phase shifts of respective sinusoidal carrier waves that are in quadrature with each other. The two phase-modulated carrier waves are recombined to produce a single outgoing carrier.

Such a carrier, on passing through a band-pass filter or other network of limited bandwidth, experiences considerable amplitude variations at the points of phase reversal; these variations, in turn, cause objectionable signal distortions upon transmission via a nonlinear channel. Prior attempts at limiting these distortions, which cannot be completely eliminated, have required rather complex circuitry which are difficult to reproduce and susceptible of malfunction.

OBJECT OF THE INVENTION

The object of my present invention, therefore, is to provide an improved method of transmitting information by dual PSK modulation, as well as a system designed to carry out that method, which avoids the aforestated inconveniences.

SUMMARY OF THE INVENTION

I have found, in accordance with the present invention, that the aforementioned amplitude variations can be minimized by judiciously selecting the instants at which the two relatively dephased sine waves undergo their respective phase reversals. More particularly, I have established that the phase reversal of the sine wave which happens to be in trailing position, as determined by the preceding phase shifts, should occur at a peak of that wave whereas the phase reversal of the sine wave in leading position should occur at a zero crossing thereof. Thus, a system according to my invention includes delay means in the output of a stream-splitting conversion circuit, of the general type described in the above-identified IEEE article, for temporarily preventing the transmission of amplitude changes of the two pulse sequences to the respective sine waves to be PSK modulated, the delay being terminated by the arrival of a trigger pulse from either of two interleaved trains of such pulses respectively coinciding with the peaks with the zero points of the associated sine waves; the selection of a trigger pulse from one or the other train occurs under the control of a discriminating network which causes the phase reversals to take place at the proper instants for minimizing the resulting amplitude excursion of the affected sine wave.

For this purpose it is necessary that the two sine waves have a frequency at least equal to half the reciprocal of the pulse width $2/f$ of the two pulse sequences, i.e. of minimum value $f/4$, in order that both a zero crossing and a peak of each sine wave should occur during a pulse period of the two pulse sequences. In conformity with a particular but nonlimitative embodiment described hereinafter, however, the sine-wave frequency equals $f/2$ so that two zero crossing (and therefore also two peaks) of each sine wave are present in each pulse period.

The delay of the phase reversal until the arrival of a trigger pulse from a selected pulse train is accomplished, pursuant to another feature of my invention, with the aid of a pair of buffer registers alternately loaded with the pulses of the corresponding pulse sequences under the control of timing means such as a source of clock pulses recurring at the cadence *f*. The conversion circuit advantageously includes, besides the conventional stream splitter, a pair of intermediate registers respectively inserted between the splitter output and the two buffer registers, the contents of the intermediate registers being alternately discharged into the associated buffer registers under the control of the clock pulses through the intermediary of a flip-flop acting as a divider for the clock-pulse frequency *f*. Each buffer register may have an input stage, which receives the contents of the associated intermediate register, and an output stage which stores the previous pulse until the arrival of a trigger pulse at a reading input thereof; thus, the discriminating network controls the selection of a trigger pulse in accordance with the relative amplitudes of the two pulse sequences — and therefore the relative phasing of the two sine waves — as established in the immediately preceding cycle or cycles. As will be explained below, the discriminating network may comprise a single Exclusive-OR gate.

According to another advantageous feature of my invention, the source of the two sine waves is an oscillator working in parallel into the two phase inverters, with interposition of a 90° phase shifter between the oscillator output and one of the inverters. The two trains of trigger pulses are then generated by a pair of zero-crossing detectors respectively connected to the oscillator output and to the phase-shifter output. The oscillator is preferably kept in step with the two pulse sequences by having a synchronizing input connected to the source of clock pulses.

BRIEF DESCRIPTION OF DRAWING

The above and other features of my invention will now be described in detail with reference to the accompanying drawing in which.

SPECIFIC DESCRIPTION

I shall first discuss the theoretical considerations underlying the concept of my present invention. Let $i(t)$ $= I_o\cos[\omega_o t + \theta_o + \psi(t)]$ represent a phase-modulated sine wave in the input of a path of limited bandwidth, with $\omega_o$ its pulsatance, $\psi(t)$ a stepped switching function changing from 0 to $\pi$ at a time $t = t_o$, and $\theta_o$ a fixed parameter representing the initial phase angle of the wave $i(t)$. The corresponding output signal is then given by $u(t) = K(t)I_o\cos[\omega_o t + \theta_0 + \psi(t)]$ wherein $K(t)$ is a time-dependent factor which modifies the original amplitude $I_o$ of the sinusoidal current. The angle function $\psi(t)$ is the phase shift due to the switching function $\psi(t)$, brought about by the passage of the signal through the aforementioned network of limited bandwidth.

I have found, from theoretical considerations confirmed by actual experiments, that the functions $K(t)$ and $\psi(t)$ significant for the output signal $u(t)$ depend not only on the transfer function of the system but also on the specific magnitude of $\theta_o$, i.e. on the phasing of the sine wave $i(t)$ with reference to the switchover time $t_o$. The value of this parameter $\theta_o$ affects not only the magnitude of $K(t)$ but also the sign of the slope of the function $\psi(t)$ and the separation of the inversion point at that function from the switchover time $t_o$.

Figure 1:
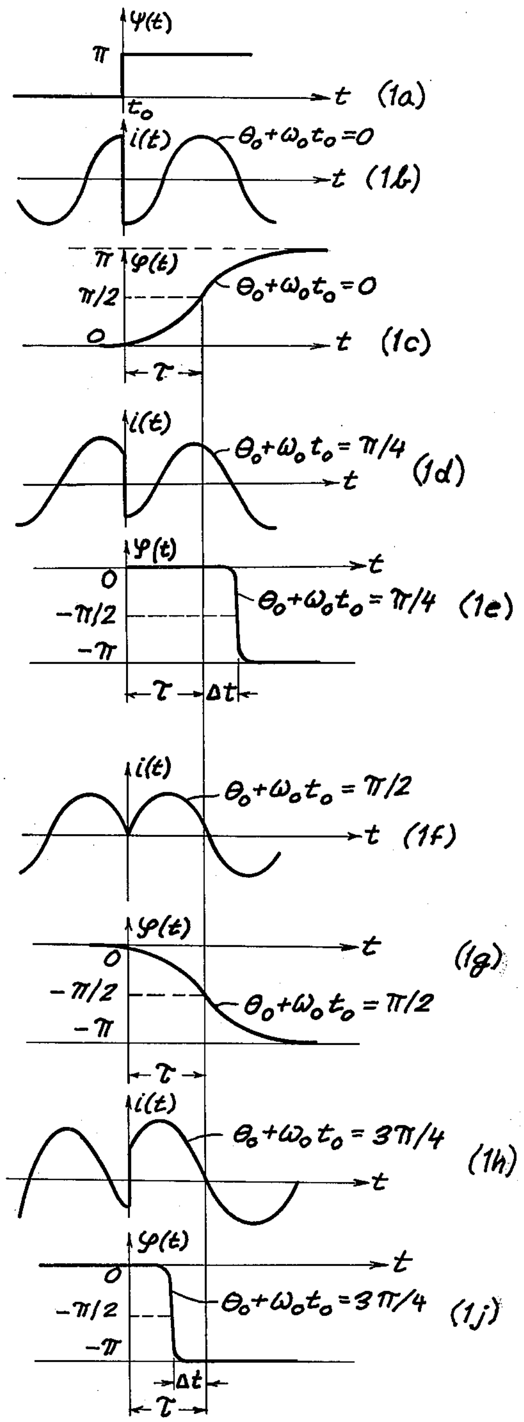
FIG. 1 is a set of graphs illustrating the effects of PSK modulation at different points of a cycle of a sinusoidal carrier wave.

Graph (1*a*) of FIG. 1 shows the switching function $\psi(t)$ whose changeover from 0 to $\pi$, at instant $t_o$, inverts the phase of a sine wave $i(t)$ as seen in graphs (1*b*), (1*d*), (1*f*) and (1*h*). The corresponding angle function $\psi$(t) has been illustrated in graphs (1*c*), (1*e*), (1*g*) and (1*j*) of FIG. 1. Graphs (1*b*) and (1*c*) relate to the case of $\omega_o t_o + \theta_o = 0$; graphs (1*d*) and (1*e*) relate to the case of $\omega_o\theta_o = \pi/4$; graphs (1*f*) and (1*g*) relate to the case of $\omega_o\theta_o = \pi/2$; graphs (1*h*) and (1*j*) relate to the case of $\omega_o t_o + \theta_o = 3\pi/4$.

The function $\psi(t)$ is here shown as a symmetrical curve with an inversion point separated from the instant $t_o$ by a delay $\tau \pm \Delta t$; the variable term $\Delta t$ of this expression goes to zero under the conditions depicted in graphs (1*c*) and (1*g*), i.e. for $\omega_o t_o = \theta_o = k\pi/2$ ($k$ (including $k = o$) being an integer). With even values of $k$, the slope of the curve $\psi(t)$ is positive as per graph (1*c*); with odd values that slope is negative as per graph (1*g*). In either case, the amplitude factor K$(t)$ is of minimum value. The delay $\tau$, here equal to half a cycle, and is a function of the characteristics of the network of limited bandwidth.

Figure 2:
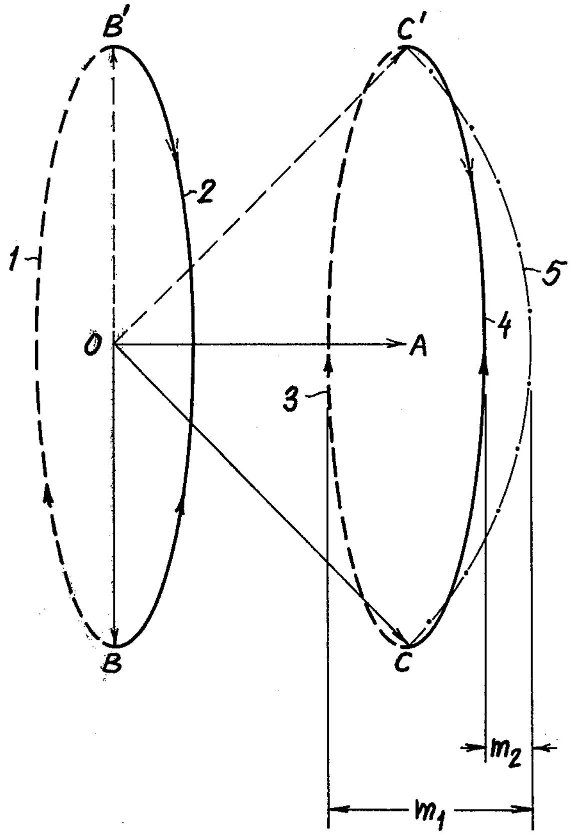
FIG. 2 is a vector diagram showing the synthesis of a resultant carrier from two PSK-modulated sine waves 90° out of phase.

In FIG. 2, a pair of sine waves in quadrature with each other have been represented by two vectors $\overrightarrow{OA}$ and $\overrightarrow{OB}$: a vector $\overrightarrow{OC}$ represents a carrier resulting from a superposition of these two waves. The two component waves are subjected to intermittent phase reversals; since, however, only their relative phase is of interest here, it shall be assumed that the position of vector $\overrightarrow{OA}$ is invariable (with the nonillustrated time axis rotating at constant speed about center 0) and that the second component wave, alone, is shifted through ± 180° between vector positions $\overrightarrow{OB}$ and $\overrightarrow{OB}'$. The transition between the two vector positions may occur either clockwise, i.e. with a negative phase shift as represented by graph (1*g*) in FIG. 1, or counterclockwise, i.e. with a positive phase shift as represented by graph (1*c*). Starting from position $\overrightarrow{OB}$, the vector follows a dotted curve 1 in the first instance and a solid curve 2 in the second instance; for a return to that starting position from position $\overrightarrow{OB}'$, the two curves are interchanged. A dotted curve 3 indicates the corresponding transition of the resulting carrier from vector position $\overrightarrow{OC}$ to an alternate vector position $\overrightarrow{OC}'$ with negative phase shift (or vice versa with positive phase shift) whereas a solid curve 4 indicates the opposite kind of shift, i.e. negative from position $\overrightarrow{OC}'$ or positive from position $\overrightarrow{OC}$. It should be noted that these generally elliptical curves 1–4 (which are somewhat simplified versions of actual test results) lie in the plane of rotation of the time axis; the resultant curves 3 and 4 can thus be directly compared with an arc 5, centered on point 0, which the resultant vector would follow if there were no amplitude distortion. At $m_1$ and $m_2$ I have shown the maximum deviations between curve 5, on the one hand, and curves 3 and 4, respectively, on the other hand, making it apparent that a shift along curves 1 and 3 leads to a considerably larger distortion than a shift along curves 2 and 4.

It follows from the above that the sine wave in trailing position, represented by vector $\overrightarrow{OB}$, should undergo a positive phase shift as per graph (1*c*) whereas the sine wave in leading position, represented by vector $\overrightarrow{OB}'$, should be subjected to a negative phase shift, in accordance with graph (1*g*), in order to minimize the resulting amplitude distortion.

Figure 3:
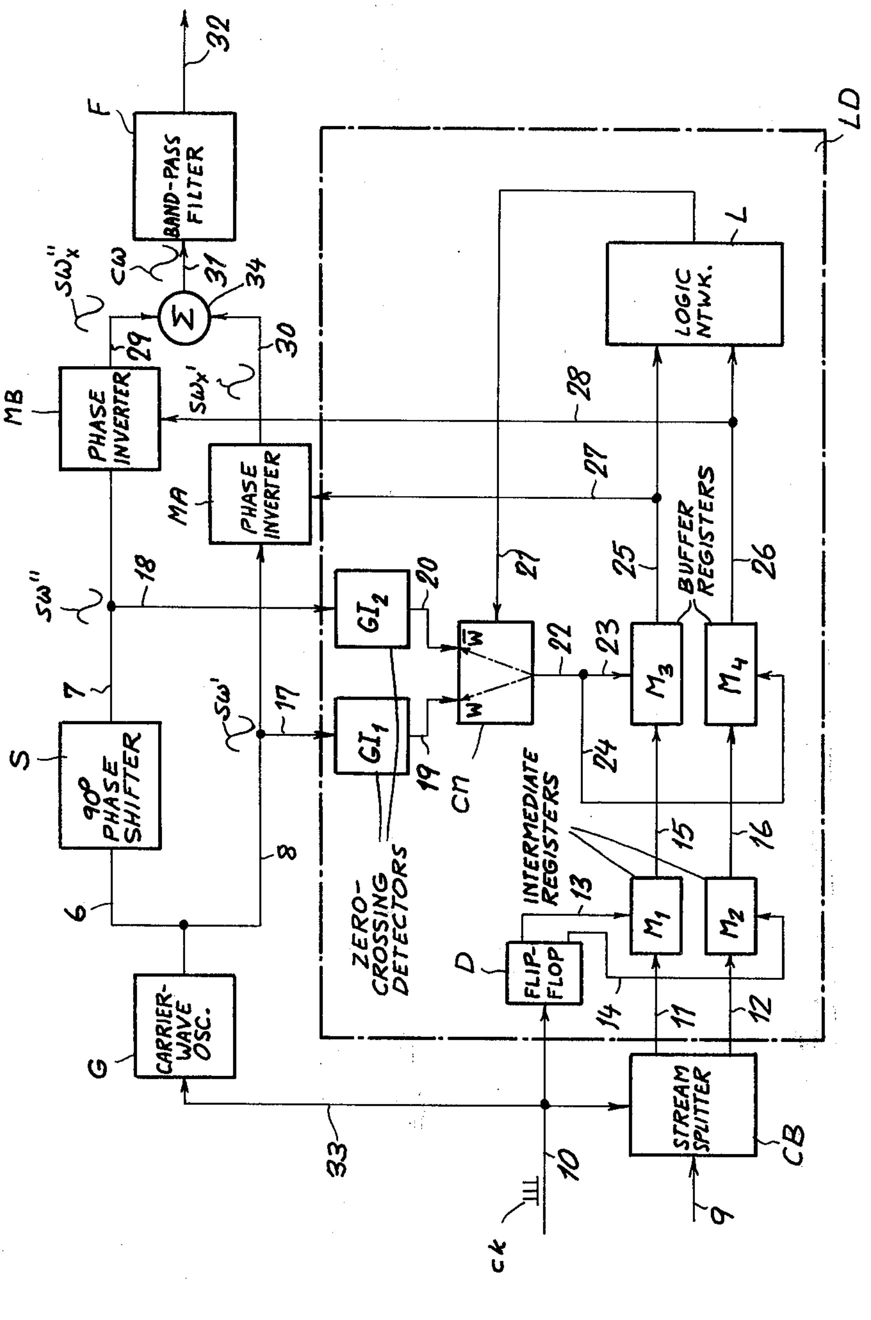
FIG. 3 is a block diagram of a data-transmitting system embodying my invention.

FIG. 3 illustrates a system for controlling the relative phase shifts of two correlated sine waves in this way. The system comprises a stream splitter CB of conventional type, as discussed above, receiving an incoming data stream over a line 9 and dividing it into two pulse sequences on a pair of lines 11 and 12, as indicated by the correspondingly designated graphs of FIG. 4; this stream splitter is controlled by a source of clock pulses *ck* appearing on a lead 10. An extension 33 of lead 10 serves to synchronize the incoming bit stream with the output of a carrier-wave oscillator G working via a lead 8 into a selectively operable phase inverter MA and via two leads 6 and 7, with an interposed 90° phase shifter S, into a similar phase inverter MB; oscillator G has a frequency $f$ equal to the cadence, or repetition frequency, of the clock pulses *ck* on lead 10 and of the data bits on lead 9. Sine wave $sw'$ on conductors 6 and 8 leads the sine wave $sw''$ on conductor 7 as will be apparent from the corresponding graphs of FIG 4; these two sine waves are also applied, via respective extension leads 17 and 18, to a pair of zero-crossing detectors $GI_1$ and $GI_2$ forming part of a circuit arrangement LD which controls the operation of phase inverters MA and MB in accordance with the aforestated principles of my present invention.

Figure 4:
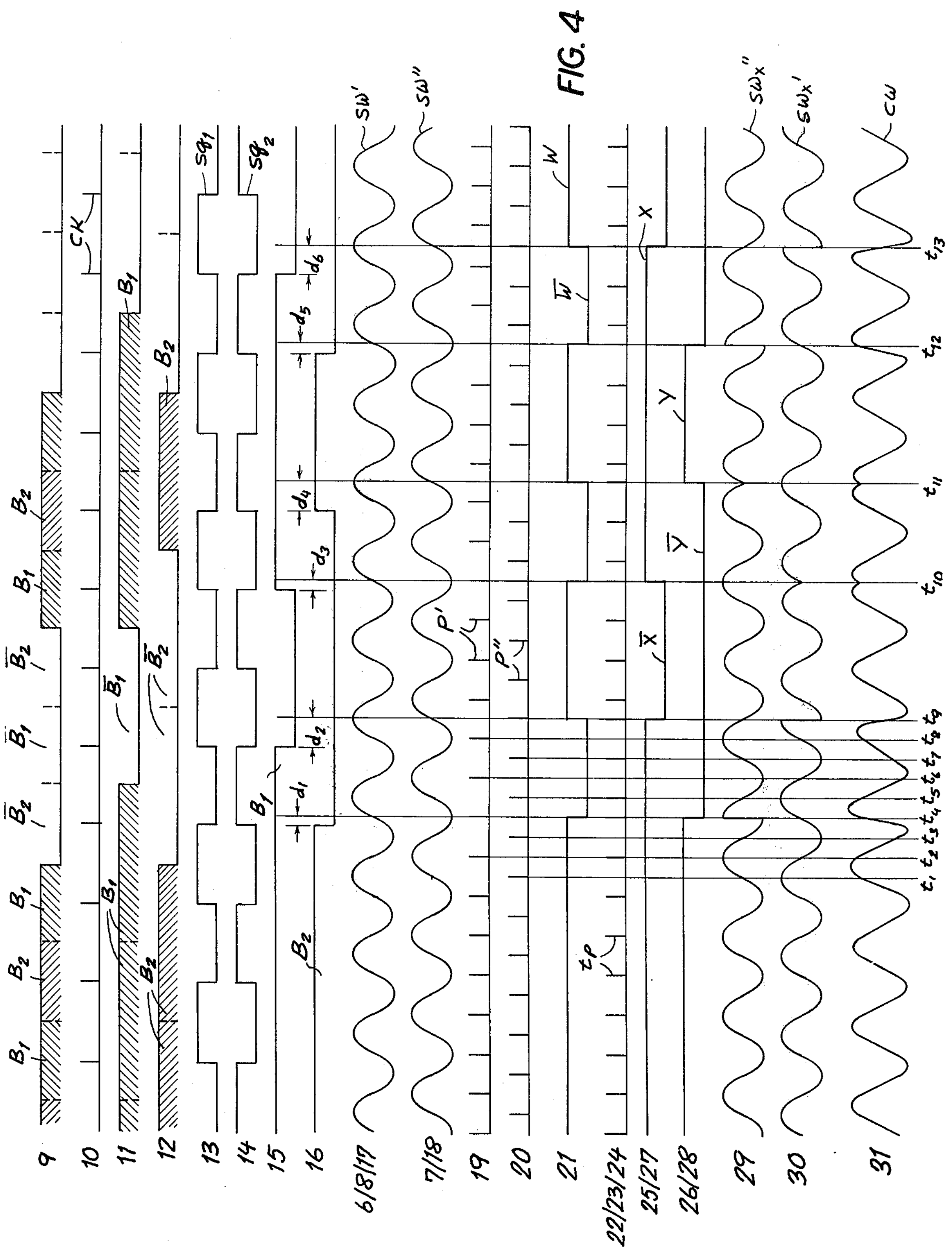
FIG. 4 is a set of graphs serving to explain the operation of the system of FIG. 3.

Component LD includes a flip-flop D, acting as a binary frequency divider, which receives the clock pulses *ck* on lead 10 and emits a pair of square waves $sq_1$, $sq_2$ of opposite polarity (FIG. 4) on its outputs 13 and 14. Lines 11 and 12 terminate at a pair of intermediate registers $M_1$, $M_2$ which store the lengthened bits $B_1$, $B_2$ of the data train on line 9 until discharged by the arrival of a rising flank of the corresponding square wave $sq_1$ or $sq_2$. Thus, as shown in FIG. 4, register $M_1$ has a high output on a lead 15 for a fraction of a cycle after the termination of a finite or unity bit $B_1$ on lead 11, and a low output on lead 15 for a fraction of a cycle after the termination of a zero bit $\overline{B}_1$ on lead 11; similarly, register $M_2$ has a high and a low output on a lead 16 for a fraction of a cycle after the termination of a finite bit $B_2$ or a zero bit $\overline{B}_2$, respectively, on lead 12. Leads 15 and 16 extend to a pair of buffer registers $M_3$ and $M_4$ whose output leads 25 and 26, however, reflect any change in their input voltages only upon the occurrence of a trigger pulse *tp* on a lead 22 with branches 23 and 24 extending to respective transfer inputs of these registers. An electronic switch CM, controlled by a logic network L via a lead 21, alternatively connects the transfer lead 22 to an output lead 19 of detector $GI_1$ (position W) or to an output lead 20 of detector $GI_2$ (position $\overline{W}$), these two detectors generating a pair of interleaved pulse trains P' and P'' coinciding with zero crossings of sine waves *sw'* and *sw''*, respectively.

Output leads 25 and 26 of buffer registers $M_3$ and $M_4$ feed the logic network L and have branches 27 and 28 extending to phase inverters MA and MB, respectively. These two phase inverters have output leads 30 and 29 extending to a summing circuit 34 whose output lead 31 is connected via a band-pass filter F to an outgoing transmission line 32; filter F has a narrow pass band centered on sine-wave frequency *f*.

Logic network L is designed to determine, from the relative values of the binary signal voltages X and Y on leads 25/27 and 26/28, the relative phase of sine waves $sw_x'$ and $sw_x''$ appearing on leads 30 and 29, downstream of phase inverters MA and MB. Depending on this determination, network L energizes or de-energizes its output lead 21 to establish one of the two switch positions $\overline{W}$ and W according to the relationship $$\overline{W} = (XY + \overline{X}\overline{Y})\overline{Z} + (X\overline{Y} + \overline{X}Y)Z \quad (1)$$

and its corollary $$W = (XY + \overline{X}\overline{Y})Z + (\overline{X}Y + X\overline{Y})\overline{Z} \quad (2)$$

where $Z$ represents a lagging condition and $\overline{Z}$ represents a leading condition of wave *sw''*, on lead 7, with reference to wave *sw'*, on lead 8. In the specific embodiment illustrated in FIGS. 3 and 4, wave *sw''* lags behind wave *sw'* so that equations (1) and (2) simplify to $$\overline{W} = X\overline{Y} + \overline{X}Y \quad (1a)$$

$$W = XY + \overline{X}\overline{Y} \quad (2a)$$

Network L, which establishes condition $W$ or $\overline{W}$ according to signal voltages $X$, $\overline{X}$ and $Y$, $\overline{Y}$, can therefore be simply an Exclusive-OR gate.

Thus, network L controls the switch CM in such a way that the trigger pulses *tp* on lead 22 are taken from the pulse train P' in the case of equation (1*a*) and from the pulse train P'' in the case of equation (2*a*), as indicated by the graphs of FIG. 4 marked 19, 20 and 22/23/24. Equation (1*a*) represents the situation in which the relative phasing of waves $sw_x'$ and $sw_x''$ on leads 29 and 30 is opposite that of waves *sw'* and *sw''* on leads 7 and 8; equation (2*a*) represents the situation in which the two phase relationships are the same. In the first instance, the wave $sw_x'$ trails the wave $sw_x''$ so that, for the reasons discussed above, any phase reversal undergone by the wave *sw'* should take place in a positive direction whereas any phase reversal of wave *sw''* should occur with a negative shift; since the trigger pulses P'' on lead 20 coincide with the zero crossings of wave *sw''* and therefore with the peaks of wave *sw'*, this requirement is satisfied by the readout of buffer registers $M_3$ and $M_4$ at the instants of these trigger pulses as determined by the connection of lead 22 with lead 20 in switch position W. In the second instance, i.e. with the wave $sw_x'$ leading the wave $sw_x''$, wave *sw'* should shift backward whereas wave *sw''* should shift forward; trigger pulses P' on lead 19, reaching the lead 22 in switch position W, coincide with the zero crossings of wave *sw'* and with the peaks of wave *sw''* so as to bring about the desired phase shift.

Let us consider an instant $t_1$ during which signals X and Y are present on leads 25 and 26, giving rise to switching position W according to equation (2*a*) as seen on the graph designated 21 in FIG. 4. With leads 19 and 22 interconnected by switch CM, no trigger pulse reaches the transfer inputs of registers $M_3$ and $M_4$ whose output voltages remain unchanged at this point.

At an instant $t_2$, a quarter cycle later, a pulse P' from lead 19 reaches the lead 22 but has no effect upon the voltages on leads 25 and 26 since the bits $B_1$ and $B_2$ on the input leads of registers $M_3$ and $M_4$ have not changed in the interim.

After another quarter cycle, at an instant $t_3$, the situation is the same as at instant $t_1$ discussed above. Shortly thereafter, the bit $B_2$ terminates on lead 16 but this voltage change is not transmitted to the output lead 26 of register $M_4$ until after a delay $d_1$, i.e. at an instant $t_4$ when leads 22–24 are energized by the next pulse P' from zero-crossing detector $GI_1$. The resulting de-energization of lead 28 causes the inverter MB to introduce a 180° phase shift in wave $sw_x''$, on lead 29, with a corresponding shift in the composite carrier wave *cw* on lead 31. At the same time, the change from signal Y to signal $\overline{Y}$ on lead 26 is sensed by the network L which thereupon reverses the switch CM, changing its position from W to $\overline{W}$ as per equation (1*a*).

A further quarter cycle later, at an instant $t_5$, a pulse P'' from zero-crossing detector $GI_2$ is transmitted to lead 22 as a trigger pulse *tp* but has no effect since no further change has occurred in the input voltages of registers $M_3$ and $M_4$. The next pulse P', occurring at an instant $t_6$, is blocked by the switch CM whereas the following pulse P'', at an instant $t_7$, reaches the lead 22 but is ineffectual as at instant $t_5$. Within the next quarter cycle, the bit $B_1$ terminates on lead 15 but the next pulse P' is again blocked, at an instant $t_8$, so that the change in the input voltage of register $M_3$ takes effect only after a delay $d_2$, i.e. at an instant $t_9$ when leads 22–24 are energized by a further pulse P''. The resulting de-energization of lead 27 causes the inverter MA to introduce a 180° phase shift in wave $sw_x'$, on lead 30, with a corresponding shift in the composite carrier wave *cw* on lead 31. The replacement of signal X by signal $\overline{X}$, on lead 25, restores the switching position W pursuant to equation (2*a*).

In an analogous manner, phase reversals and switchovers occur at instants $t_{10}$, $t_{11}$, $t_{12}$ and $t_{13}$ after respective delays $d_3$, $d_4$, $d_5$ and $d_6$ measured from the rising and falling edges of the lengthened bits $B_1$, $B_2$ stored in intermediate registers $M_1$ and $M_2$. All these delays, it will be noted, last for less than half a cycle of sine waves *sw'* and *sw''*.

The passage of the phase-modulated carrier wave *cw* through filter F entails only a moderate amplitude distortion which is considerably less than with random phase shifting as practiced in conventional systems of this general type.

I claim:

1. A system for transmitting information contained in a bit stream having a cadence $f$, comprising:

conversion means for deriving from said bit stream a pair of pulse sequences of pulse width $2/f$ composed of lengthened alternate bits of said bit stream;

a source of two sine waves, of a frequency at least equal to half the reciprocal of said pulse width $2/f$, in quadrature with each other;

a pair of phase inverters for said sine waves respectively responsive to said square waves for translating amplitude changes of said pulse sequences into 180° phase shifts of said sine waves;

pulse-generating means for producing two interleaved trains of trigger pulses respectively coinciding with the zero crossings of said sine waves;

delay means connected to said conversion means for preventing the transmission of said amplitude changes to said phase inverters until the arrival of a trigger pulse;

discriminating means responsive to the relative amplitudes of said pulse sequences for controlling the transmission of said trigger pulses to said delay means to reverse the phase of a sine wave in trailing position only at a peak thereof and of a sine wave in leading position only at a zero crossing thereof; and circuit means of limited bandwidth connected to said source downstream of said phase inverters for synthesizing a phase-modulated carrier from the combined sine waves.

2. A system as defined in claim 1 wherein said circuit means comprises a summing circuit followed by a linear bandpass filter.

3. A system as defined in claim 1 wherein said delay means comprises a pair of buffer registers and timing means synchronized with said conversion means for alternately loading said buffer registers with the pulses of said pulse sequences, respectively, said discriminating means including a selection network connected to the outputs of said buffer registers and switch means controlled by said selection network for applying trigger pulses from either train in parallel to respective reading inputs of said buffer registers.

4. A system as defined in claim 3 wherein said selection network is an Exclusive-OR gate.

5. A system as defined in claim 3 wherein said source comprises an oscillator working in parallel into said phase inverters and a 90° phase shifter inserted between said oscillator and one of said phase inverters, said pulse-generating means including a pair of zero-crossing detectors respectively connected to the output of said oscillator and to the output of said phase shifter.

6. A system as defined in claim 5 wherein said oscillator has a synchronizing input connected to said timing means for maintaining a predetermined time position between said trigger pulses and the pulses of said pulse sequences.

7. A system as defined in claim 5 wherein said conversion means comprises a stream splitter, a pair of intermediate registers inserted between said stream splitter and said buffer registers, and transfer means alternately operable by said timing means for discharging said intermediate registers into said buffer registers.

8. A system as defined in claim 7 wherein said loading means comprises a flip-flop switchable by said timing means.

9. A method of transmitting information contained in a bit stream having a cadence $f$, comprising the steps of:

converting said bit stream into a pair of pulse sequences of pulse width $2/f$ composed of lengthened alternate bits of said bit stream;

generating a pair of sine waves, of a frequency at least equal to half the reciprocal of said pulse width $2/f$, in quadrature with each other;

determining at each instant the relative phase of said sine waves;

reversing the phase of each sine wave in response to amplitude changes of a respective pulse sequence, a phase reversal of a sine wave in trailing position taking place only at a peak thereof and a phase reversal of a sine wave in leading position taking place only at a zero crossing thereof; and combining the two sine waves into an outgoing carrier.

10. A method as defined in claim 9 wherein said sine waves are of frequency $f/2$.

* * * * *